United States Patent
Fujimura et al.

(10) Patent No.: US 11,339,676 B2
(45) Date of Patent: May 24, 2022

(54) AIRCRAFT GAS TURBINE, AND ROTOR BLADE OF AIRCRAFT GAS TURBINE

(71) Applicant: MITSUBISHI HEAVY INDUSTRIES AERO ENGINES, LTD., Komaki (JP)

(72) Inventors: Daigo Fujimura, Tokyo (JP); Takaaki Hase, Komaki (JP); Hirokazu Hagiwara, Komaki (JP)

(73) Assignee: MITSUBISHI HEAVY INDUSTRIES AERO ENGINES, LTD., Aichi (JP)

( * ) Notice: Subject to any disclaimer, the term of this patent is extended or adjusted under 35 U.S.C. 154(b) by 21 days.

(21) Appl. No.: 16/761,510

(22) PCT Filed: Dec. 4, 2018

(86) PCT No.: PCT/JP2018/044544
§ 371 (c)(1),
(2) Date: May 5, 2020

(87) PCT Pub. No.: WO2019/131011
PCT Pub. Date: Jul. 4, 2019

(65) Prior Publication Data
US 2021/0180464 A1 Jun. 17, 2021

(30) Foreign Application Priority Data
Dec. 28, 2017 (JP) .............................. JP2017-253224

(51) Int. Cl.
*F01D 11/02* (2006.01)
*F02C 7/28* (2006.01)
(Continued)

(52) U.S. Cl.
CPC .............. *F01D 11/02* (2013.01); *F01D 11/08* (2013.01); *F02C 7/28* (2013.01); *F16J 15/447* (2013.01);
(Continued)

(58) Field of Classification Search
CPC .......... F01D 11/00; F01D 11/02; F01D 11/08; F01D 11/12; F01D 11/122; F01D 11/125;
(Continued)

(56) References Cited

U.S. PATENT DOCUMENTS

| 5,188,507 A | 2/1993 | Sweeney |
| 5,290,144 A * | 3/1994 | Kreitmeier .............. F01D 5/225 |
| | | 415/171.1 |

(Continued)

FOREIGN PATENT DOCUMENTS

| DE | 102009040758 A1 | 3/2011 |
| EP | 2096262 A1 | 2/2008 |

(Continued)

OTHER PUBLICATIONS

International Search Report and Written Opinion of International Application No. PCT/JP2018/044544 dated Jan. 15, 2019; 16pp.

*Primary Examiner* — Woody A Lee, Jr.
*Assistant Examiner* — Elton K Wong
(74) *Attorney, Agent, or Firm* — Kanesaka Berner and Partners LLP

(57) ABSTRACT

This aircraft gas turbine is provided with a rotor, a rotor blade (24), a casing, a stationary blade (26), and a guide member (53). The rotor blade (24) has fins (43) projecting from the outer peripheral surface (42a) of a rotor blade shroud (42). A stationary blade shroud (51) of the stationary blade (26) forms a cavity (Ct) with at least the rotor blade shroud (42) and the fins (43). The guide member (53) is provided inside the cavity (Ct) and extends inward from the radial outer side, and an inner-side end part (53a) on the radial inner side faces the outer peripheral surface (42a) of the rotor blade shroud (42) with a gap therebetween.

2 Claims, 3 Drawing Sheets

(51) Int. Cl.
*F16J 15/447* (2006.01)
*F01D 11/08* (2006.01)

(52) U.S. Cl.
CPC .... *F05D 2220/323* (2013.01); *F05D 2240/55* (2013.01)

(58) Field of Classification Search
CPC ......... F01D 11/127; F02C 7/28; F16J 15/447; F16J 15/472; F16J 15/4474; F16J 15/4476; F16J 15/4478; F16J 15/453; F05D 2220/323; F05D 2240/55
See application file for complete search history.

(56) References Cited

U.S. PATENT DOCUMENTS

| | | | |
|---|---|---|---|
| 2003/0007866 A1* | 1/2003 | Ito | F01D 5/225 415/182.1 |
| 2005/0058539 A1 | 3/2005 | Diakunchak | |
| 2011/0070072 A1 | 3/2011 | Subramaniyan | |
| 2011/0280715 A1 | 11/2011 | Garg et al. | |
| 2013/0149118 A1* | 6/2013 | Lotfi | F01D 11/02 415/174.5 |
| 2013/0149165 A1 | 6/2013 | Boeck | |
| 2013/0266426 A1 | 10/2013 | Mahle et al. | |
| 2013/0266427 A1 | 10/2013 | Mahle et al. | |
| 2015/0184750 A1* | 7/2015 | Kuwamura | F01D 5/225 277/355 |

FOREIGN PATENT DOCUMENTS

| | | |
|---|---|---|
| EP | 2302169 A2 | 3/2011 |
| EP | 2386724 A2 | 11/2011 |
| EP | 3147460 A1 | 9/2015 |
| EP | 2957718 A1 | 12/2015 |
| JP | H05195988 A | 8/1993 |
| JP | H05240066 A | 9/1993 |
| JP | 2005273489 A | 10/2005 |
| JP | 2007120476 A | 5/2007 |
| JP | 2009047043 A | 3/2009 |
| JP | 2011069361 A | 4/2011 |
| JP | 2011237033 A | 11/2011 |
| JP | 2013019537 A | 1/2013 |
| JP | 2018135847 A | 8/2018 |

* cited by examiner

AIRCRAFT GAS TURBINE, AND ROTOR BLADE OF AIRCRAFT GAS TURBINE

RELATED APPLICATIONS

The present application is a National Phase of International Application Number PCT/JP2018/044544 filed Dec. 4, 2018 and claims priority to Japanese Application Number 2017-253224 filed Dec. 28, 2017.

TECHNICAL FIELD

The present invention relates to an aircraft gas turbine and a rotor blade of an aircraft gas turbine.

Priority is claimed on Japanese Patent Application No. 2017-253224 filed on Dec. 28, 2017, the content of which is incorporated herein by reference.

BACKGROUND ART

In an aircraft gas turbine, a part of the main flow of a combustion gas passes through the gap between a rotor blade and a housing without passing through the rotor blade. Accordingly, it is desired to reduce the flow rate of the combustion gas passing through the gap to improve the output.

Patent Literature 1 discloses an aircraft gas turbine in which a fin or a honeycomb facing the tip of the fin via a gap is provided as a non-contact seal structure so that the flow rate of the combustion gas passing through the gap between the rotor blade and the housing is reduced.

CITATION LIST

Patent Literature

[PTL 1] US Patent Application Publication No. 2013/0266426

SUMMARY OF INVENTION

Technical Problem

However, in the aircraft gas turbine described in Patent Literature 1, the flow of the combustion gas passing through the gap in the seal structure may flow radially inward from the cavity formed between the rotor blade and a stationary blade. The direction of flow of the combustion gas that has passed through the gap of the seal structure is significantly different from the direction of flow of the main flow that has passed through the rotor blade. Accordingly, the combustion gas that has passed through the gap of the seal structure collides and is mixed with the main flow and an increase in mixing loss may arise as a result.

An object of the present invention is to provide an aircraft gas turbine and a rotor blade of an aircraft gas turbine with which it is possible to achieve an improvement in output by reducing the mixing loss at a time when the combustion gas that has passed through the gap of the seal structure collides and is mixed with the main flow that has passed through the rotor blade.

Solution to Problem

According to a first aspect of the present invention, an aircraft gas turbine includes a rotor rotating around an axis, a rotor blade having a rotor blade main body extending radially outward from the rotor, a rotor blade shroud provided at a tip of the rotor blade main body, and a fin projecting from an outer peripheral surface of the rotor blade shroud, a casing surrounding the rotor and the rotor blade from an outer periphery side and forming a gap with the fin, a stationary blade having a stationary blade shroud fixed to the casing on a downstream side of the rotor blade and forming a cavity with at least the rotor blade shroud and the fin and a stationary blade main body extending radially inward from the stationary blade shroud, and a guide member provided in the cavity and extending inward from a radial outer side, an inner-side end part of the guide member on a radial inner side facing the outer peripheral surface of the rotor blade shroud with a gap therebetween.

In this configuration, a combustion gas that has passed through the gap formed between the casing and the fin flows into the cavity formed by the rotor blade shroud, the fin, and the stationary blade shroud. At that time, the combustion gas G passes between the inner-side end part of the guide member and the outer peripheral surface of the rotor blade shroud, which are spaced apart in the radial direction about the axis. Accordingly, the combustion gas G is blown out in an axial direction from the cavity. In other words, it is possible to align the direction of flow of the combustion gas blown out of the cavity with the direction of flow of a main flow.

Accordingly, it is possible to prevent the flow of the main flow from being hindered when the combustion gas blown out of the cavity merges with the main flow.

Further, the flow of the combustion gas that has passed through the gap between the casing and the fin and flowed into the cavity can be guided to the radial inner side by the guide member. Accordingly, it is possible to cause the combustion gas to collide with the combustion gas, which is about to flow into the gap between the inner-side end part of the guide member and the outer peripheral surface of the rotor blade shroud, from a direction intersecting with the flow of the combustion gas.

Accordingly, the flow of the combustion gas about to flow in between the inner-side end part of the guide member and the outer peripheral surface of the rotor blade shroud can be contracted and the flow rate of the combustion gas merging with the main flow from the cavity can be reduced.

According to a second aspect of the present invention, in the aircraft gas turbine according to the first aspect, the outer peripheral surface of the rotor blade shroud facing the inner-side end part may be formed in parallel with the axis.

With this configuration, it is possible to prevent contact between the guide member and the rotor blade shroud even in a case where the rotor blade shroud is displaced in the axial direction with respect to the guide member.

According to a third aspect of the present invention, the guide member according to the first or second aspect may be provided with an inclined portion inclined so as to approach the stationary blade in a direction in which the axis extends radially outward from the inner-side end part.

With this configuration, it is possible to further contract the flow of the combustion gas about to flow in between the inner-side end part of the guide member and the outer peripheral surface of the rotor blade shroud.

According to a fourth aspect of the present invention, in the aircraft gas turbine according to any one of the first to third aspects, the gap between the inner-side end part and the outer peripheral surface of the rotor blade shroud may be formed so as to be larger than the gap between the fin and the casing.

With this configuration, it is possible to increase the area of the combustion gas flow path formed between the inner-side end part of the guide member and the outer peripheral surface of the rotor blade shroud. Accordingly, it is possible to reduce the flow speed of the combustion gas blown out of the cavity.

Accordingly, it is possible to further prevent the combustion gas blown out of the cavity from affecting the flow of the main flow.

According to a fifth aspect of the present invention, in the aircraft gas turbine according to any one of the first to fourth aspects, the inner-side end part of the guide member may be disposed closer to the radial inner side than an inner peripheral surface of the stationary blade shroud.

With this configuration, it is possible to prevent a collision between the stationary blade shroud and the combustion gas flowing out of the cavity. Accordingly, it is possible to prevent the combustion gas flowing out of the cavity from merging with the flow of the main flow from a direction intersecting with the flow of the main flow.

According to a sixth aspect of the present invention, a rotor blade of an aircraft gas turbine is a rotor blade of an aircraft gas turbine provided with a rotor rotating around an axis, a casing surrounding the rotor from an outer periphery side, a stationary blade having a stationary blade shroud fixed to the casing and a stationary blade main body extending radially inward from the stationary blade shroud, and a guide member extending inward from a radial outer side and the rotor blade includes a rotor blade main body extending radially outward from the rotor, a rotor blade shroud provided at a tip of the rotor blade main body, and a fin projecting from an outer peripheral surface of the rotor blade shroud, in which the rotor blade shroud and the fin form a cavity with at least the stationary blade shroud on a downstream side of the rotor blade main body and a radial-inner-side end part of the guide member provided in the cavity faces the outer peripheral surface of the rotor blade shroud and the outer peripheral surface is formed in parallel with the axis.

In this configuration, a combustion gas passes through the gap formed between the casing and the fin and flows into the cavity formed by the rotor blade shroud, the fin, the casing, and the stationary blade shroud. The combustion gas G that has flowed into the cavity is blown out after passing between the inner-side end part of the guide member and the outer peripheral surface of the rotor blade shroud formed in parallel with the axis, which are spaced apart in the radial direction about the axis. Accordingly, the combustion gas G is blown out in an axial direction from the cavity. In other words, it is possible to align the direction of flow of the combustion gas blown out of the cavity with the direction of flow of a main flow. Accordingly, it is possible to prevent the flow of the main flow from being hindered when the combustion gas blown out of the cavity merges with the main flow. Further, it is possible to prevent contact between the guide member and the rotor blade shroud even in a case where the rotor blade shroud is displaced in the axial direction with respect to the guide member.

Advantageous Effects of Invention

With the aircraft gas turbine and the rotor blade of an aircraft gas turbine, it is possible to achieve an improvement in output by reducing the mixing loss at a time when the combustion gas that has passed through the gap of the seal structure collides and is mixed with the main flow that has passed through the rotor blade.

DESCRIPTION OF EMBODIMENTS

Next, an aircraft gas turbine and a rotor blade of an aircraft gas turbine according to an embodiment of the present invention will be described with reference to the drawings.

Figure 1:
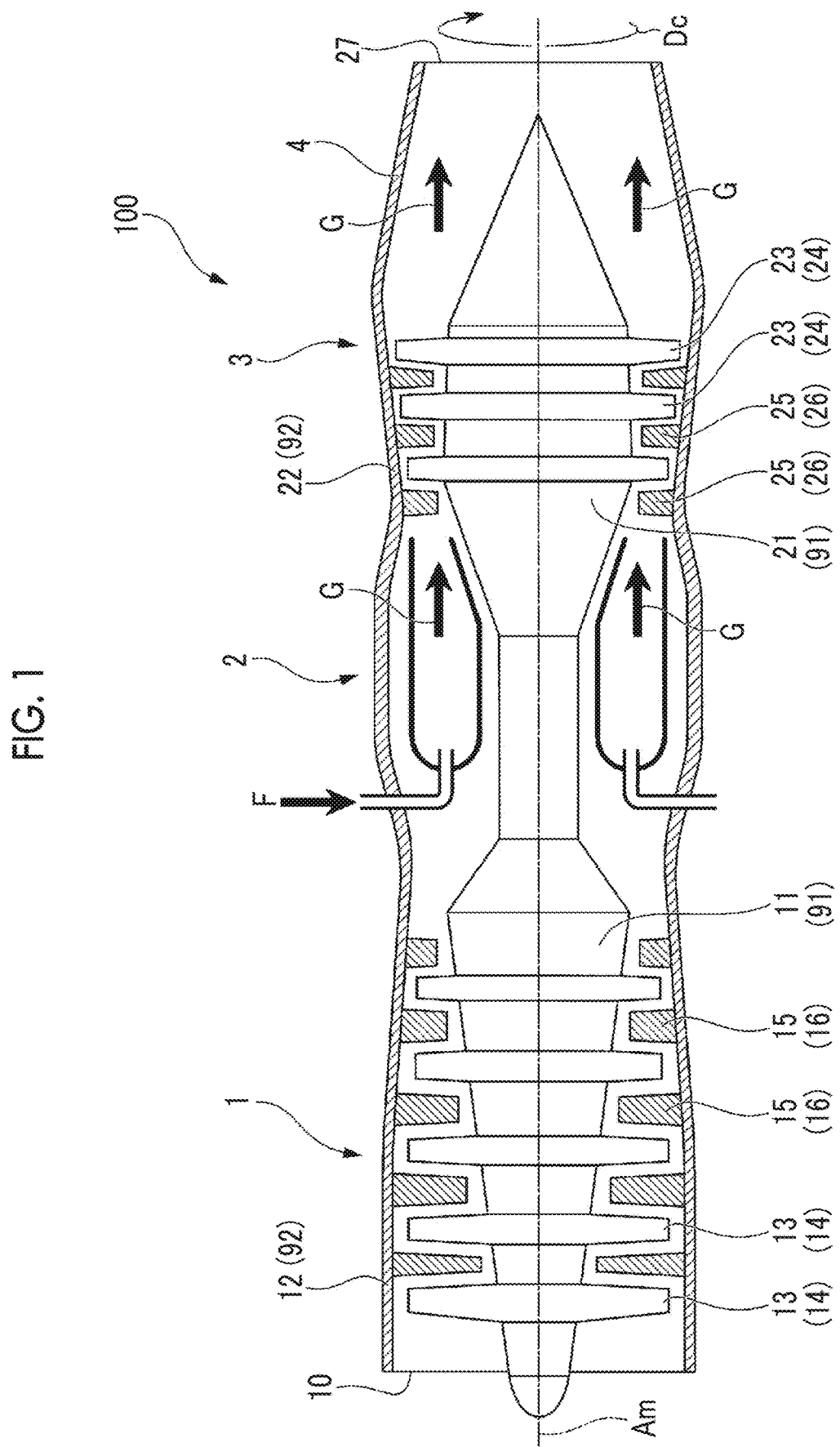
FIG. 1 is a configuration diagram illustrating a schematic configuration of an aircraft gas turbine of an embodiment of the present invention.

FIG. 1 is a configuration diagram illustrating a schematic configuration of the aircraft gas turbine of the embodiment of the present invention.

As illustrated in FIG. 1, an aircraft gas turbine 100 according to this first embodiment is for obtaining thrust of an aircraft. This gas turbine 100 mainly includes a compressor 1, a combustion chamber 2, and a turbine 3.

The compressor 1 generates high-pressure air by compressing air taken in from an intake duct 10. This compressor 1 includes a compressor rotor 11 and a compressor casing 12. The compressor casing 12 covers the compressor rotor 11 from an outer periphery side and extends along an axis Am.

A plurality of compressor rotor blade stages 13 arranged with a gap therebetween in the axis Am direction are provided on the outer peripheral surface of the compressor rotor 11. The compressor rotor blade stages 13 respectively include a plurality of compressor rotor blades 14. The respective compressor rotor blades 14 of the compressor rotor blade stages 13 are arranged on the outer peripheral surface of the compressor rotor 11 with a gap therebetween in the circumferential direction of the axis Am.

A plurality of compressor stationary blade stages 15 arranged with a gap therebetween in the axis Am direction are provided on the inner peripheral surface of the compressor casing 12. The compressor stationary blade stages 15 are disposed alternately with the compressor rotor blade stages 13 in the axis Am direction. The compressor stationary blade stages 15 respectively include a plurality of compressor stationary blades 16. The respective compressor stationary blades 16 of the compressor stationary blade stages 15 are arranged on the inner peripheral surface of the compressor casing 12 with a gap therebetween in the circumferential direction of the axis Am.

The combustion chamber 2 generates a combustion gas G by mixing a fuel F with the high-pressure air generated by the compressor 1 and performing combustion on the mixture. The combustion chamber 2 is provided between the compressor casing 12 and a turbine casing (casing) 22 of the turbine 3. The combustion gas G generated by the combustion chamber 2 is supplied to the turbine 3.

The turbine 3 is driven by the high-temperature and high-pressure combustion gas G generated in the combustion chamber 2. More specifically, the turbine 3 expands the high-temperature and high-pressure combustion gas G and converts the heat energy of the combustion gas G into rotational energy. The turbine 3 includes a turbine rotor 21 and the turbine casing 22.

The turbine rotor 21 extends along the axis Am. A plurality of turbine rotor blade stages 23 arranged with a gap therebetween in the axis Am direction are provided on the outer peripheral surface of the turbine rotor 21. The turbine rotor blade stages 23 respectively include a plurality of turbine rotor blades 24. The respective turbine rotor blades 24 of the turbine rotor blade stages 23 are arranged on the outer peripheral surface of the turbine rotor 21 with a gap therebetween in the circumferential direction of the axis Am.

The turbine casing 22 covers the turbine rotor 21 from an outer periphery side. A plurality of turbine stationary blade stages 25 arranged with a gap therebetween in the axis Am direction are provided on the inner peripheral surface of the turbine casing 22. The turbine stationary blade stages 25 are disposed alternately with the turbine rotor blade stages 23 in the axis Am direction. The turbine stationary blade stages 25 respectively include a plurality of turbine stationary blades 26. The respective turbine stationary blades 26 of the turbine stationary blade stages 25 are arranged on the inner peripheral surface of the turbine casing 22 with a gap therebetween in the circumferential direction of the axis Am.

The compressor rotor 11 and the turbine rotor 21 are integrally connected in the axis Am direction. The compressor rotor 11 and the turbine rotor 21 constitute a gas turbine rotor 91. Likewise, the compressor casing 12 and the turbine casing 22 are integrally connected along the axis Am. The compressor casing 12 and the turbine casing 22 constitute a gas turbine casing 92.

The gas turbine rotor 91 is integrally rotatable around the axis Am in the gas turbine casing 92.

When the aircraft gas turbine 100 configured as described above is operated, the compressor rotor 11 (gas turbine rotor 91) is first driven to rotate by an external driving source. External air is sequentially compressed as the compressor rotor 11 rotates and high-pressure air is generated. This high-pressure air is supplied into the combustion chamber 2 through the compressor casing 12. In the combustion chamber 2, the fuel is mixed with the high-pressure air, combustion is performed on the mixture, and the high-temperature and high-pressure combustion gas is generated as a result. The combustion gas is supplied into the turbine 3 through the turbine casing 22.

In the turbine 3, a rotational driving force is applied to the turbine rotor 21 (gas turbine rotor 91) by the combustion gas sequentially colliding with the turbine rotor blade stage 23 and the turbine stationary blade stage 25. This rotational energy is mainly used for driving the compressor 1. The combustion gas G that has driven the turbine 3 is increased in flow speed by an exhaust nozzle 4, becomes a jet generating thrust, and is discharged to the outside from an injection port 27. It should be noted that a single-shaft turbojet engine has been described as an example of the aircraft gas turbine in this embodiment. However, the present invention is not limited to the single-shaft turbojet engine and any form of aircraft gas turbine is possible.

Figure 2:
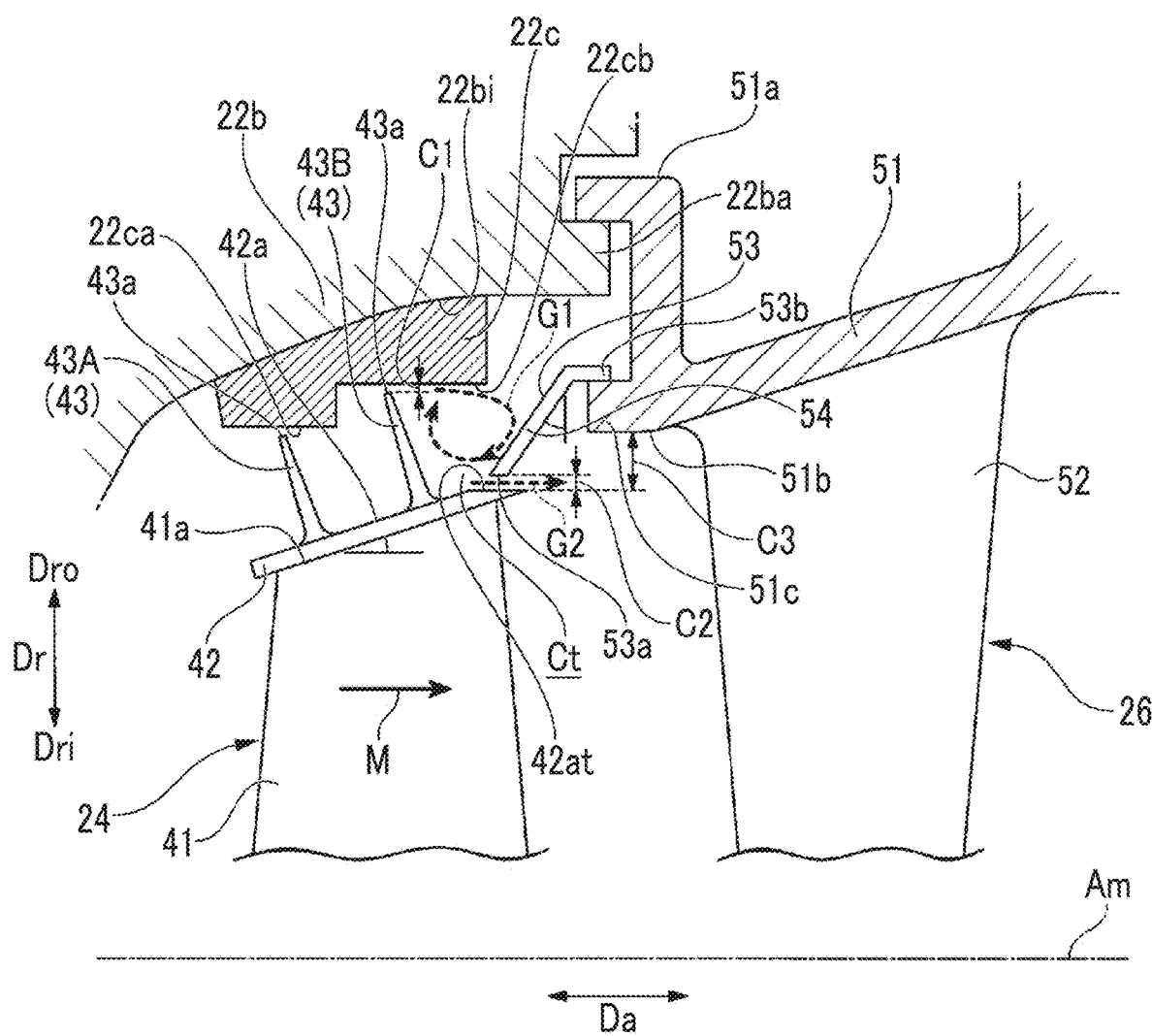
FIG. 2 is a partial cross-sectional view in which the vicinity of an end part of a rotor blade in the embodiment of the present invention is enlarged.

FIG. 2 is a partial cross-sectional view in which the vicinity of an end part of the rotor blade in the embodiment of the present invention is enlarged.

As illustrated in FIG. 2, the turbine rotor blade 24 of the turbine 3 has a rotor blade main body 41, a rotor blade shroud 42, and fins 43. The rotor blade main body 41 extends radially outward from the turbine rotor 21. The rotor blade shroud 42 is provided at a tip 41a of the rotor blade main body 41. More specifically, the rotor blade shroud 42 is provided at the tip 41a of the rotor blade main body 41 on the outer side in a radial direction Dr about the axis Am (hereinafter, simply referred to as a radial outer side Dro). The rotor blade shrouds 42 are formed at all the tips 41a of the turbine rotor blades 24 disposed side by side in a circumferential direction Dc (see FIG. 1) about the axis Am. These rotor blade shrouds 42 form an annular shape by the rotor blade shrouds 42 of the turbine rotor blades 24 mutually adjacent in the circumferential direction Dc being disposed so as to be mutually adjacent. It should be noted that the rotor blade shrouds 42 may be integrally formed in the circumferential direction Dc.

The rotor blade shroud 42 illustrated in FIG. 2 illustrates a case where the rotor blade shroud 42 is inclined so as to be disposed on the outer side in the radial direction Dr toward the downstream side of a main flow M with respect to the axis Am. However, the angle of inclination of the rotor blade shroud 42 is an example and the rotor blade shroud 42 may be formed in parallel with the axis Am.

The fin 43 projects from an outer peripheral surface 42a of the rotor blade shroud 42. The two fins 43 that are exemplified in this embodiment are provided with a gap therebetween in the direction in which the axis Am extends (hereinafter, simply referred to as an axial direction Da). It should be noted that the two fins 43 will be respectively referred to as a fin 43A and a fin 43B in the following description.

The fin 43A and the fin 43B extend so as to block the gap between the turbine rotor blade 24 and the turbine casing 22 outside the turbine rotor blade 24 in the radial direction Dr. In addition, the fin 43A and the fin 43B are provided for each turbine rotor blade 24 as in the case of the rotor blade shroud 42 and the fins 43A and 43B of the turbine rotor blades 24 mutually adjacent in the circumferential direction Dc form a annular shape continuous in the circumferential direction Dc by being disposed so as to be mutually adjacent.

Respective tips 43a of the fins 43A and 43B are disposed via a slight clearance C1 with respect to the inner peripheral surface of the turbine casing 22 (more specifically, inner peripheral surfaces 22ca and 22cb of a damper seal 22c). These clearances C1 are formed as small as possible within a range in which the clearances C1 do not come into contact with the inner peripheral surface of the turbine casing 22 due to thermal deformation, vibration, or the like. It should be noted that the inclination angles of the fins 43A and 43B with respect to the outer peripheral surface 42a are not limited to a right angle although the fins 43A and 43B exemplified in this embodiment extend substantially perpendicularly to the outer peripheral surface 42a of the rotor blade shroud 42. In addition, the number of the fins 43 is not limited to two. For example, the number of the fins 43 may be one or three or more.

Here, the turbine casing 22 includes a casing main body (not illustrated), a blade ring (not illustrated), a heat shield ring (not illustrated), a split ring 22b, and the damper seal 22c. The casing main body (not illustrated) is formed in a tubular shape surrounding the turbine rotor 21 and turbine rotor blade 24 from an outer periphery side and supports the blade ring (not illustrated) on the inner periphery side thereof. The blade ring (not illustrated) is formed in an annular shape about the axis Am and is disposed on the radial outer side Dro of a plurality of the split rings 22b and the turbine stationary blades 26. The heat shield ring (not illustrated) is disposed between the blade ring (not illustrated) and the split ring 22b and between the blade ring (not illustrated) and the turbine stationary blade 26 in the radial direction Dr. The heat shield ring (not illustrated) interconnects the blade ring (not illustrated) and the split ring 22b and interconnects the blade ring (not illustrated) and the turbine stationary blade 26.

The damper seal 22c prevents a part of the main flow M from passing through the gaps respectively formed between the fin 43A and the turbine casing 22 and between the fin 43B and the turbine casing 22. The damper seal 22c in this embodiment constitutes a non-contact seal structure with the fins 43A and 43B. The damper seal 22c is fixed to an inner peripheral surface 22bi of the split ring 22b. A member having a honeycomb structure and opening on a radial inner side Dri or the like can be used as the damper seal 22c.

The damper seal 22c exemplified in this embodiment has the two inner peripheral surfaces 22ca and 22cb facing the respective tips 43a of the fins 43A and 43B. These inner peripheral surfaces 22ca and 22cb constitute the inner peripheral surface of the turbine casing 22 at the location where the damper seal 22c is disposed. In other words, the gap between the inner peripheral surface 22ca of the damper seal 22c and the fin 43A and the gap between the inner peripheral surface 22cb and the fin 43 are the same clearance C1.

In addition, the inner peripheral surfaces 22ca and 22cb of the damper seal 22c in this embodiment are respectively formed in parallel with the axis Am and have different positions in the radial direction Dr. In other words, the damper seal 22c is formed in a step shape. It should be noted that the shape of the damper seal 22c is not limited to the shape exemplified in this embodiment. In addition, the tips 43a of the fins 43A and 43B may be disposed so as to face the inner peripheral surface 22bi of the split ring 22b with the damper seal 22c omitted in the turbine casing 22.

The turbine stationary blade 26 includes at least a stationary blade shroud 51 and a stationary blade main body 52.

The stationary blade shroud 51 forms a cavity Ct with the rotor blade shroud 42 and the fin 43B. The stationary blade shroud 51 is disposed downstream of the turbine rotor blade 24 in the direction in which the main flow M flows (hereinafter, simply referred to as the downstream side) and fixed to the turbine casing 22.

The stationary blade shroud 51 in this embodiment includes a hook portion 51a on the upstream side in the direction in which the main flow M flows (hereinafter, simply referred to as the upstream side). The stationary blade shroud 51 is fixed to a downstream-side end part 22ba of the split ring 22b by the hook portion 51a. In addition, the stationary blade shroud 51 is formed in an annular shape continuous in the circumferential direction Dc about the axis Am. The flow path of the main flow M is formed on the radial inner side Dri of the stationary blade shroud 51.

The stationary blade main body 52 extends from the stationary blade shroud 51 toward the radial inner side Dri. The turbine stationary blade 26 is fixed to the turbine casing 22 via the stationary blade shroud 51.

The turbine 3 described above further includes a guide member 53 in the cavity Ct.

The guide member 53 extends from the radial outer side Dro toward the radial inner side Dri. The guide member 53 is formed in an annular shape continuous in the circumferential direction Dc. Here, the guide member 53 may be integrally molded and form an annular shape as in the case of the rotor blade shroud 42 or may form an annular shape by a plurality of segments (that is, arc-shaped members) being combined.

An inner-side end part 53a that is on the radial inner side Dri of the guide member 53 faces the outer peripheral surface 42a of the rotor blade shroud 42 via a gap.

More specifically, the inner-side end part 53a of the guide member 53 is disposed so as to face a downstream-side end part 42at in the radial direction Dr. The downstream-side end part 42at is the part of the outer peripheral surface 42a of the rotor blade shroud 42 that is positioned on the most downstream side. And the inner-side end part 53a in this embodiment has a surface parallel with the downstream-side end part 42at.

A clearance C2 of the gap formed between the inner-side end part 53a and the downstream-side end part 42at is formed so as to be larger than the clearance C1 described above and is formed so as to be smaller than a distance C3 between an inner peripheral surface 51b of the stationary blade shroud 51 and the outer peripheral surface 42a of the rotor blade shroud 42 in the radial direction Dr. In other words, the inner-side end part 53a of the guide member 53 is disposed closer to the radial inner side Dri than the inner peripheral surface 51b of the stationary blade shroud 51. It should be noted that FIG. 2 illustrates a case where the inner-side end part 53a is formed in parallel with the downstream-side end part 42at. However, it is also possible that the inner-side end part 53a does not have a surface parallel with the downstream-side end part 42at.

The downstream-side end part 42at of the rotor blade shroud 42 extends in parallel with the axis Am. Here, as described above, the rotor blade shroud 42 in this embodiment is inclined with respect to the axis Am so as to be separated to the radial outer side Dro and the downstream side. Accordingly, the part where the downstream-side end part 42at of the rotor blade shroud 42 is formed has a thickness in the radial direction Dr that gradually decreases toward the downstream side in the axial direction Da. It should be noted that a case where the part where the downstream-side end part 42at is formed in the rotor blade shroud 42 illustrated in FIG. 2 is sharp toward the downstream side in the axial direction Da has been exemplified and the part does not necessarily have to be sharp.

Further, the guide member 53 includes an inclined portion 54. The inclined portion 54 is inclined so as to approach the turbine stationary blade 26 in the axial direction Da, that is, downstream from the inner-side end part 53a toward the radial outer side Dro. As for the guide member 53 in this embodiment, an outer-side end part 53b, which is the end part of the guide member 53 that is on the radial outer side Dro, is fixed to an upstream-side end part 51c of the stationary blade shroud 51. Accordingly, the inclination angle of the inclined portion 54 is an inclination angle corresponding to the positional relationship between the upstream-side end part 51c of the stationary blade shroud 51 and the downstream-side end part 42at of the rotor blade shroud 42. It should be noted that FIG. 2 illustrates a case where the inclination angle of the inclined portion 54 is constant and the inclination angle of the inclined portion 54 may not be constant. In addition, the shape of the outer-side end part 53b of the guide member 53 is not limited to the shape illustrated in FIG. 2. The shape of the outer-side end part 53b may be appropriately changed in accordance with the shape of the location where the outer-side end part 53b is fixed.

The gas turbine 100 of this embodiment has the configuration described above. Next, the action of the gas turbine 100 will be described with reference to FIG. 2.

First, a part of the main flow M of the combustion gas G flows into the cavity Ct by passing through the clearance C1 of the fins 43A and 43B. At this time, a combustion gas G1 that has flowed into the cavity Ct flows along the inner peripheral surface 22cb of the damper seal 22c. Subsequently, the flow of the combustion gas G1 is guided toward the radial inner side Dri by the guide member 53.

In the meantime, a combustion gas G2 that flows out of the cavity Ct flows in the axial direction Da through the gap between the guide member 53 and the downstream-side end part 42at. The combustion gas G2 flowing out of the cavity Ct is contracted by the combustion gas G1 guided toward the radial inner side Dri by the guide member 53 and the flow rate thereof is reduced.

Then, when the contracted combustion gas G2 flows out of the cavity Ct, the pressure of the contracted combustion gas G2 is recovered by the contracted combustion gas G2 passing through the gap of the clearance C2, which is larger than the clearance C1. In other words, the flow speed of the combustion gas G is reduced before the combustion gas G merges with the main flow M. Then, the combustion gas G2 merges with the main flow M after being blown out downstream along the axis Am from the cavity Ct.

Accordingly, in the embodiment described above, the combustion gas G1 that has passed between the damper seal 22c and the fin 43B flows into the cavity Ct formed by the rotor blade shroud 42, the fin 43B, and the stationary blade shroud 51. Then, the combustion gas G1 that has flowed into the cavity Ct passes as the combustion gas G2 between the inner-side end part 53a of the guide member 53 and the outer peripheral surface 42a of the rotor blade shroud 42, which are spaced apart in the radial direction Dr. Accordingly, the combustion gas G2 is blown out in the axial direction Da from the cavity Ct. In other words, it is possible to smoothly merge a cavity flow with the main flow M by aligning the direction of flow of the main flow M with the direction of the cavity flow, which is the flow of the combustion gas G2 blown out of the cavity Ct. As a result, it is possible to prevent the flow of the main flow M from being hindered when the combustion gas G2 blown out of the cavity Ct merges with the main flow M.

Further, the flow of the combustion gas G1 that has passed between the damper seal 22c and the fin 43B and flowed into the cavity Ct can be guided to the radial inner side Dri by the guide member 53. Accordingly, it is possible to cause the combustion gas G1 to collide with the combustion gas G2, which is about to flow into the gap between the inner-side end part 53a of the guide member 53 and the outer peripheral surface 42a of the rotor blade shroud 42, from a direction intersecting with the flow of the combustion gas G2. As a result, the flow of the combustion gas G2 about to flow into the gap between the inner-side end part 53a of the guide member 53 and the outer peripheral surface 42a of the rotor blade shroud 42 can be contracted and the flow rate of the cavity flow, which is the combustion gas G2 that is blown out of the cavity Ct, can be reduced.

As a result, the mixing loss at a time when the cavity flow collides and is mixed with the flow of the main flow M that has passed through the turbine rotor blade 24 can be reduced and the output of the gas turbine 100 can be improved.

In addition, in the embodiment described above, the downstream-side end part 42at of the outer peripheral surface 42a of the rotor blade shroud 42 facing the inner-side end part 53a is formed in parallel with the axis Am. As a result, contact between the guide member 53 and the rotor blade shroud 42 can be prevented in a case where the rotor blade shroud 42 is displaced in the axial direction Da with respect to the guide member 53.

Further, the guide member 53 includes the inclined portion 54 in the embodiment described above, and thus the flow of the combustion gas G2 about to flow in between the inner-side end part 53a of the guide member 53 and the outer peripheral surface 42a of the rotor blade shroud 42 can be further contracted.

In addition, since the clearance C2 is larger than the clearance C1, the cross-sectional area of the flow path formed between the inner-side end part 53a and the outer peripheral surface 42a of the rotor blade shroud 42 can be increased. Accordingly, it is possible to reduce the flow speed of the combustion gas G2 flowing through the gap between the inner-side end part 53a and the outer peripheral surface 42a of the rotor blade shroud 42. As a result, it is possible to further prevent the flow of the main flow M from being affected.

Further, the inner-side end part 53a of the guide member 53 is disposed closer to the radial inner side Dri than the inner peripheral surface 51b of the stationary blade shroud 51. Accordingly, it is possible to prevent the cavity flow blown out of the cavity Ct from colliding with the stationary blade shroud 51. Accordingly, it is possible to prevent the cavity flow from colliding with the stationary blade shroud 51, changing in direction, and merging with the main flow M from a direction intersecting with the main flow M.

Hereinafter, modification examples of the embodiment described above will be described with reference to FIG. 3. It should be noted that the modification examples of this embodiment are different from the embodiment described above only in the configuration of the guide member. Accordingly, the same parts as those in the embodiment described above will be denoted by the same reference numerals and redundant description will be omitted.

Figure 3:
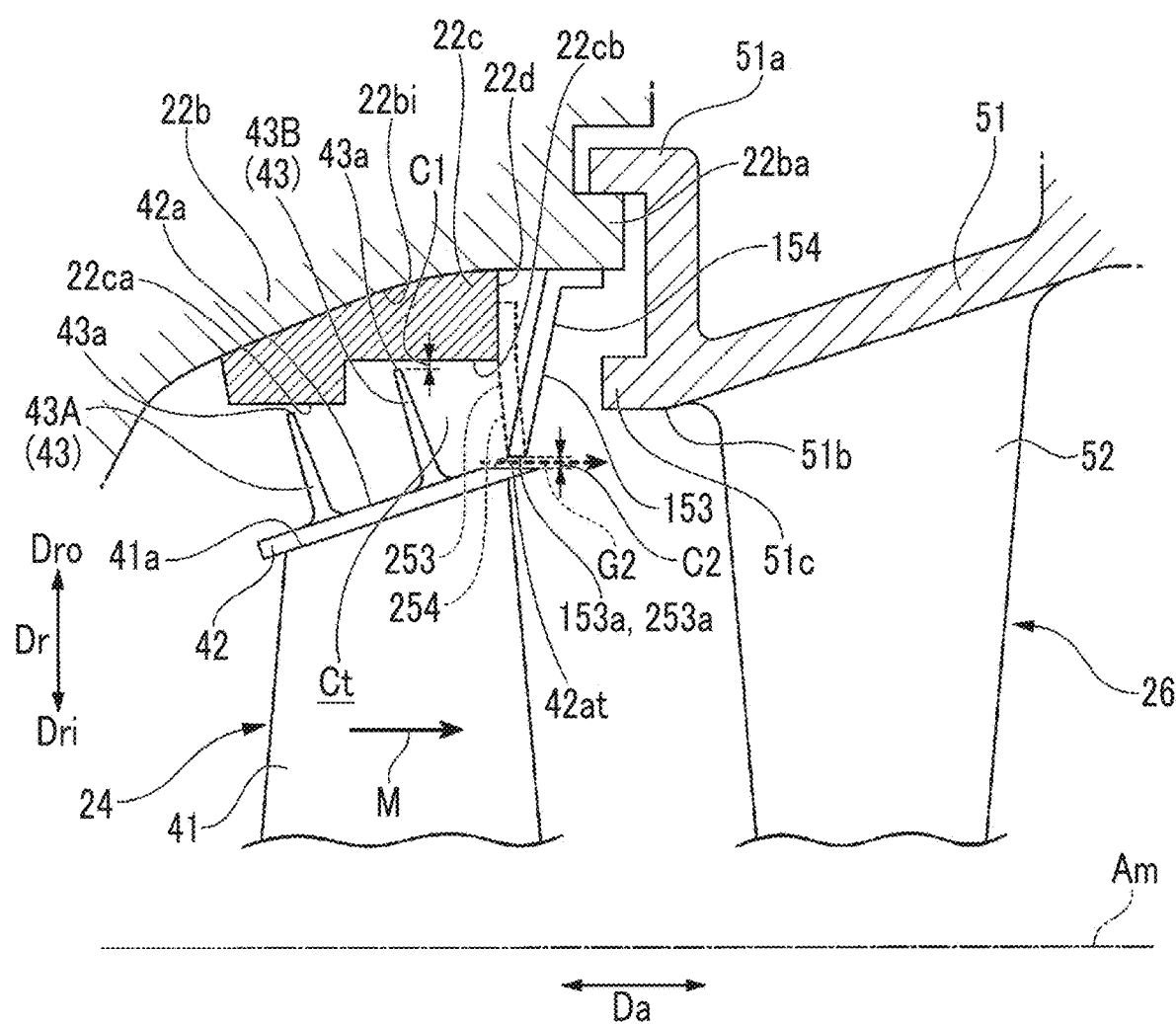
FIG. 3 is a partial cross-sectional view corresponding to FIG. 2 in each modification example of the embodiment of the present invention.

FIG. 3 is a partial cross-sectional view corresponding to FIG. 2 in each modification example of the embodiment of the present invention.

First Modification Example

A case where the guide member 53 is fixed to the stationary blade shroud 51 has been described in the embodiment described above. However, the fixing position of the guide member 53 is not limited to the stationary blade shroud 51. For example, the guide member 53 may be fixed to the inner peripheral surface 22bi of the split ring 22b as in a guide member 153, which is indicated by a solid line in FIG. 3.

Second Modification Example

Further, as indicated by a broken line in FIG. 3, the fixing position of a guide member 253 may be a downstream-side surface 22d of the damper seal 22c.

In the first and second modification examples as well as the embodiment described above, the effect of contracting the combustion gas G2 flowing out of the cavity Ct can be obtained and the flow speed of the combustion gas G2 flowing out of the cavity Ct can be reduced. Accordingly, the mixing loss at a time when the cavity flow collides and is mixed with the flow of the main flow M can be reduced. Accordingly, the output of the gas turbine 100 can be improved.

It should be noted that a case where the direction of inclination of the guide member 253 of the second modification example is opposite to the direction of inclination of the guide member 53 of the above embodiment or the guide member 153 of the first modification example has been exemplified. In the second modification example inclined in this manner, the contraction effect is reduced as compared with the above embodiment and the first modification example and the effect of reducing the leakage flow rate of the combustion gas G2 by means of the clearance C2 of the guide member 253 and the downstream-side end part 42at becomes dominant.

The present invention is not limited to the configuration of the above embodiment or each modification example and a change in design is possible within the gist thereof.

For example, although a case where the downstream-side end part 42at of the outer peripheral surface 42a of the rotor blade shroud 42 is formed in parallel with the axis Am has been described in the embodiment and each modification example, the downstream-side end part 42at is not limited to the formation parallel with the axis Am.

In addition, although cases where the guide member 53 includes the inclined portion 54, the guide member 153 includes an inclined portion 154, and the guide member 253 includes an inclined portion 254 have been described in the embodiment and the modification examples, the inclined portions 54, 154, and 254 may not be provided. In other words, the guide member 53 may be formed so as to extend in, for example, the radial direction Dr.

Further, although a case where the clearance C2 is larger than the clearance C1 has been described in the embodiment, the present invention is not limited thereto. For example, the clearance C2 may be the same as or slightly smaller than the clearance C1.

In addition, a single-shaft turbojet engine has been described as an example of the aircraft gas turbine in the embodiment described above. However, the present invention is also applicable to a multi-shaft turbofan engine, a turboshaft engine for helicopters, and the like.

Further, although an axial compressor has been exemplified as the compressor 1 in the above-described embodiment, the compressor 1 is not limited to the axial compressor.

INDUSTRIAL APPLICABILITY

With the aircraft gas turbine and the rotor blade of an aircraft gas turbine, it is possible to achieve an improvement in output by reducing the mixing loss at a time when the combustion gas that has passed through the gap of the seal structure collides and is mixed with the main flow that has passed through the rotor blade.

REFERENCE SIGNS LIST

1: Compressor
2: Combustion chamber
3: Turbine
4: Exhaust nozzle
10: Intake duct
11: Compressor rotor
12: Compressor casing
13: Compressor rotor blade stage
14: Compressor rotor blade
15: Compressor stationary blade stage
16: Compressor stationary blade
21: Turbine rotor
22: Turbine casing (casing)
22b: Split ring
22ba: End part
22bi: Inner peripheral surface
22c: Damper seal
22ca: Inner peripheral surface
22cb: Inner peripheral surface
22d: Side surface
23: Turbine rotor blade stage
24: Turbine rotor blade
25: Turbine stationary blade stage
26: Turbine stationary blade
27: Injection port
41: Rotor blade main body
41a: tip
42: Rotor blade shroud
42a: Outer peripheral surface
42at: Downstream-side end part
43: Fin
43a: tip
43A: Fin
43B: Fin
51: Stationary blade shroud
51a: Hook portion
51b: Inner peripheral surface
51c: Upstream-side end part
52: Stationary blade main body
53, 153, 253: Guide member
53a: Inner-side end part
53b: Outer-side end part
54, 154, 254: Inclined portion
91: Gas turbine rotor
92: Gas turbine casing
100: Gas turbine

The invention claimed is:

1. An aircraft gas turbine comprising:
a rotor rotating around an axis;
a rotor blade having a rotor blade main body extending radially outward from the rotor, a rotor blade shroud provided at a tip of the rotor blade main body, and a fin projecting from an outer peripheral surface of the rotor blade shroud;
a casing surrounding an outer periphery of the rotor and the rotor blade and forming a gap with the fin;
a stationary blade having a stationary blade shroud and a stationary blade main body, the stationary blade shroud being fixed to the casing on a downstream side of the rotor blade, a cavity being defined by at least the stationary blade shroud, the rotor blade shroud, and the fin, and the stationary blade main body extending radially inward from the stationary blade shroud; and
a guide member provided in the cavity, extending radially inward, and including an inner-side end part located at an end on a radial inner side of the guide member and facing the outer peripheral surface of the rotor blade shroud with a gap therebetween,
wherein the outer peripheral surface of the rotor blade shroud facing the inner-side end part is formed in parallel with the axis,
wherein the guide member is provided with an inclined portion in which a direction from the inner-side end part of the guide member toward a radially outward end of the guide member is inclined toward the stationary blade in a direction in which the axis extends, and
wherein the axis is closer to the inner-side end part of the guide member than to an inner peripheral surface of the stationary blade shroud.

2. The aircraft gas turbine according to claim 1, wherein the gap between the inner-side end part and the outer peripheral surface of the rotor blade shroud is formed so as to be larger than the gap between the fin and the casing.

* * * * *